US012761329B2

(12) United States Patent
McLeod et al.

(10) Patent No.: US 12,761,329 B2
(45) Date of Patent: Oct. 13, 2026

(54) TIME-OF-FLIGHT CLOSEST TARGET RANGING WITH PULSE DISTORTION IMMUNITY

(71) Applicant: STMicroelectronics International N.V., Geneva (CH)

(72) Inventors: Stuart McLeod, Edinburgh (GB); Andreas Assmann, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 894 days.

(21) Appl. No.: 18/176,163

(22) Filed: Feb. 28, 2023

(65) Prior Publication Data

US 2024/0288557 A1 Aug. 29, 2024

(51) Int. Cl.

*G01S 7/4865* (2020.01)
*G01S 7/48* (2006.01)
*G01S 17/89* (2020.01)

(52) U.S. Cl.

CPC .......... *G01S 7/4865* (2013.01); *G01S 7/4808* (2013.01); *G01S 17/89* (2013.01)

(58) Field of Classification Search

CPC ...... G01S 7/4865; G01S 7/4808; G01S 17/89; G01S 7/4816; G01S 7/4876; G01S 7/497; G01S 7/495; G01S 17/10

See application file for complete search history.

(56) References Cited

U.S. PATENT DOCUMENTS

| | | | | |
|---|---|---|---|---|
| 9,786,701 | B2 | 10/2017 | Mellot | |
| 9,960,295 | B2 | 5/2018 | McLeod et al. | |
| 10,796,191 | B2 | 10/2020 | De Salivet de Fouchecour et al. | |
| 11,320,514 | B2 | 5/2022 | Keller et al. | |
| 2002/0036765 | A1 | 3/2002 | McCaffrey et al. | |
| 2017/0115381 | A1 | 4/2017 | Moore et al. | |
| 2021/0184684 | A1* | 6/2021 | Oh | H03L 7/0818 |
| 2021/0349184 | A1* | 11/2021 | Adachi | G01S 7/4814 |
| 2022/0236386 | A1* | 7/2022 | Ma | H04N 25/77 |
| 2022/0236412 | A1* | 7/2022 | Shoji | G01S 17/10 |
| 2022/0291358 | A1 | 9/2022 | Taylor et al. | |
| 2023/0042254 | A1 | 2/2023 | Sakaguchi | |
| 2024/0077586 | A1* | 3/2024 | Lee | G01S 17/931 |

FOREIGN PATENT DOCUMENTS

| | | | | |
|---|---|---|---|---|
| EP | 3370078 | A1 * | 9/2018 | G01S 17/10 |

* cited by examiner

*Primary Examiner* — Isam A Alsomiri
*Assistant Examiner* — Joseph C Fritchman
(74) *Attorney, Agent, or Firm* — Slater Matsil, LLP

(57) ABSTRACT

A method of determining a distance of a closest target using a time-of-flight (ToF) ranging system includes: receiving, by a processor, a histogram generated by a ToF imager of the ToF ranging system, where the ToF imager is configured to transmit a light pulse for ranging purpose; finding a first rising edge in the histogram that corresponds to a rising edge of a reflected light pulse from the closest target; and calculating a first estimate of the distance of the closest target by adding a pre-determined offset to a distance of the first rising edge.

12 Claims, 11 Drawing Sheets

TIME-OF-FLIGHT CLOSEST TARGET RANGING WITH PULSE DISTORTION IMMUNITY

TECHNICAL FIELD

The present invention relates generally to time-of-flight (ToF) ranging systems, and, in particular embodiments, to ToF ranging systems for determining the distance of the closest target.

BACKGROUND

Time-of-flight (ToF) imagers (also referred to as ToF sensors) have been widely used recently for various applications, such as gesture/facial recognition, light detection and ranging (LiDAR), virtual reality, augmented reality, and autonomous robotics. A ToF ranging system uses a ToF imager to measure the distance of an object (e.g., a target). To measure an object, the ToF ranging system instructs the ToF sensor to send a light signal (e.g., light pulses) towards the object and measures the time taken by the signal to travel to the object and back.

Single photon avalanche diode (SPAD) may be used as a detector of reflected light. In some applications, an array of SPADs is provided as a sensor (e.g., an SPAD array) in order to detect a reflected light pulse. A reflected photon may generate a carrier in the SPAD through the photo electric effect. The photon-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array. The histogram for each SPAD includes a plurality of histogram bins, where each histogram bin corresponds to a distance (or a narrow range of distance) from the SPAD array, and the value (e.g., signal count) of each histogram bin corresponds to the number of detected avalanche current events (e.g., number of detected photons).

The histogram from the SPAD needs to be processed to extract useful information, such as the number of targets detected, the distances of the targets, and so on. Challenges remain in the processing of the histogram. For example, when the received light pulse shape is distorted and no longer resembles the transmitted light pulse shape (e.g., transmitted by the ToF sensor), and/or when the reflected light pulses from multiple targets merge together, detecting the distance of the target(s) may be difficult. In addition, the processing of histogram is usually computationally intensive and is often performed by an off-chip processor that is located in a different semiconductor die from the semiconductor die having the SPAD array. Efficient processing for the histogram of the SPAD is needed to reduce computational complexity and to enable higher-level of integration for ToF imagers and/or ToF ranging systems.

SUMMARY

In an embodiment, a method of determining a distance of a closest target using a time-of-flight (ToF) ranging system includes: receiving, by a processor, a histogram generated by a ToF imager of the ToF ranging system, where the ToF imager is configured to transmit a light pulse for ranging purpose; finding a first rising edge in the histogram that corresponds to a rising edge of a reflected light pulse from the closest target; and calculating a first estimate of the distance of the closest target by adding a pre-determined offset to a distance of the first rising edge.

In an embodiment, a method of operating a time-of-flight (ToF) ranging system includes: transmitting, by a light source of the ToF ranging system, light pulses toward one or more targets; receiving, by a ToF sensor of the ToF ranging system, the light pulses reflected by the one or more targets; generating a histogram based on the received light pulses; generating a differential histogram by computing differences between adjacent histogram bins of the histogram and assigning the computed differences as values of respective histogram bins of the differential histogram; finding a first histogram bin of the differential histogram, wherein a first value of the first histogram bin of the differential histogram is larger than a pre-determined threshold or is a maximum value of the values of the histogram bins of the differential histogram; and computing an estimate of a distance of a closest target by adding a pre-determined offset to a first distance of the first histogram bin.

In an embodiment, a time-of-flight (ToF) ranging system includes: a light source configured to transmit light pulses for illuminating one or more targets; a ToF sensor configured to receive reflected light pulses from the one or more targets and to generate a histogram based on the reflected light pulses; a processor configured to determine a distance of a closest target of the one or more targets by: finding a first rising edge in the histogram that corresponds to a rising edge of a reflected light pulse reflected by the closest target; and calculating an estimate of the distance of the closest target by adding a pre-determined offset to a distance of the first rising edge.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, the same or similar reference symbols generally designate the same or similar component parts throughout the various figures, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of time-of-flight (ToF) ranging systems, and in particular embodiments, to ToF ranging system capable of estimating the distance of a closest target with pulse distortion immunity.

Figure 1:
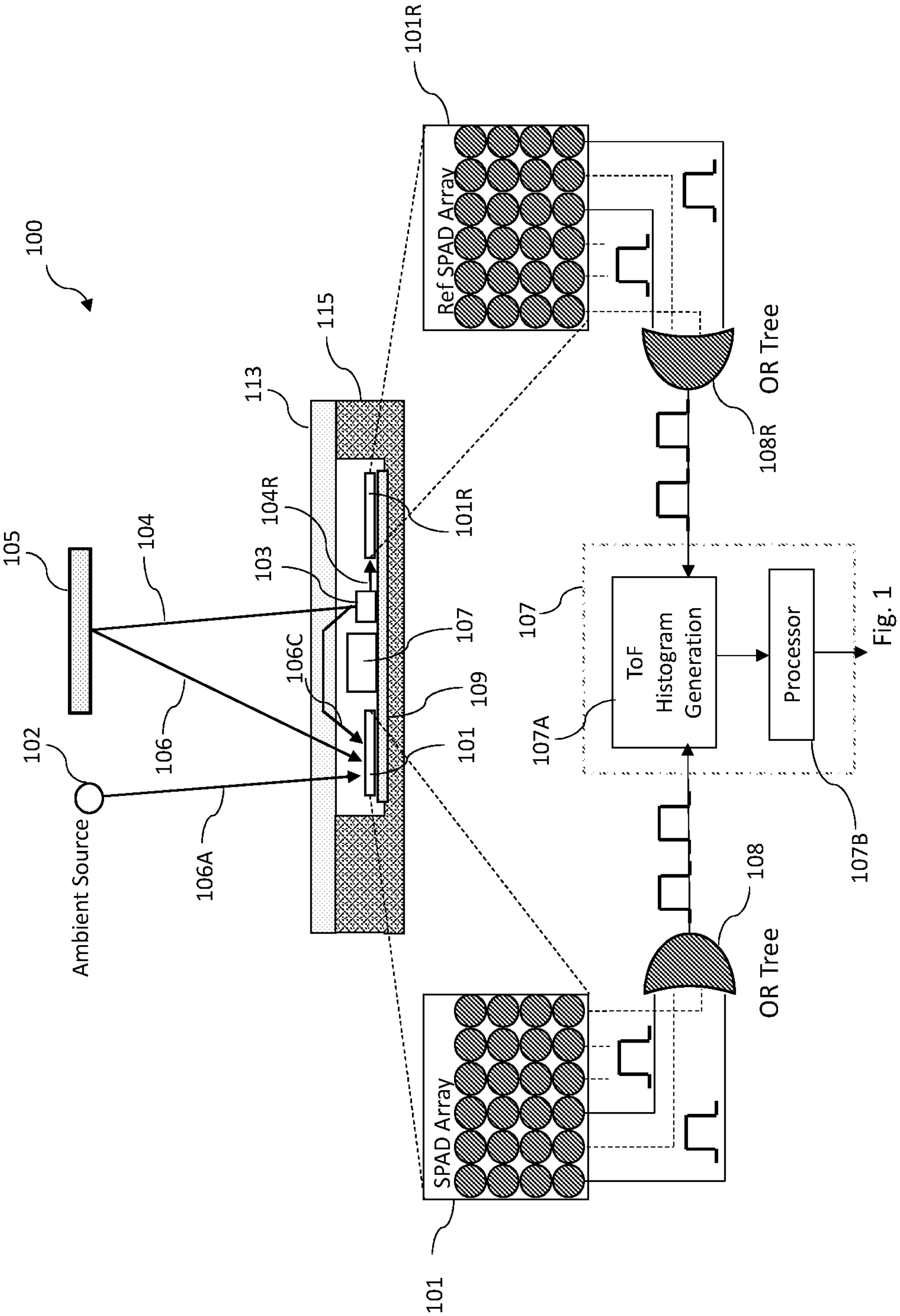
FIG. 1 illustrates a time-of-flight (ToF) ranging system, in an embodiment.

FIG. 1 illustrates a time-of-flight (ToF) ranging system 100, in an embodiment. Note that for simplicity, not all features of the ToF ranging system 100 are illustrated. In addition, to facilitate discussion, FIG. 1 illustrates an object 105 (e.g., a target) and an ambient source 102, with the understanding that the object 105 and the ambient source 102 are not part of the ToF ranging system 100. The upper portion of FIG. 1 illustrates the cross-sectional view of the ToF ranging system 100, while the lower portion of FIG. 1 illustrates details of some components of the ToF ranging system 100, such as the top views of SPAD array 101 and reference SPAD array 101R, the output pulses (e.g., indicating avalanche current events) generated by the SPADs in the SPAD array 101 and the reference SPAD array 101R, the OR trees used to combine the output pulses, and details of processing unit 107.

As illustrated in FIG. 1, the ToF ranging system 100 includes a SPAD array 101, a reference SPAD array 101R, a light source 103 (also referred to as an emitter), and a processing unit 107 attached to a substrate 109 (e.g., a printed circuit board (PCB), an interposer, or the like). FIG. 1 further illustrates an assembly housing 115 (e.g., a protective case, a box, a shell, or the like). The SPAD array 101, the reference SPAD array 101R, the light source 103, the processing unit 107, and the substrate 109 are located inside a space surrounded by the assembly housing 115. A cover glass 113 is attached to upper surfaces of the sidewalls of the assembly housing 115, thereby forming an enclosed space to protect the components disposed within the space. The attachment of the cover glass 113 to the assembly housing 115 shown in FIG. 1 is merely a non-limiting example. The cover glass 113 may be attached by any suitable method.

The light source 103 is a circuit configured to generate a light signal 104 for illuminating an object 105 (e.g., a target). The light source 103 may be, e.g., a vertical-cavity surface-emitting laser (VCSEL) device, a light-emitting diode (LED), an infra-red (IR) device, or the like. The light signal 104 may include a plurality of light pulses. The reflected light signal 106 from the object 105 is received by the SPAD array 101. The SPAD array 101 includes a plurality of SPADs arranged in, e.g., rows and columns. In the example of FIG. 1, the reference SPAD array 101R receives a reference light signal 104R from the light source 103, and provides a reference SPAD output. The reference SPAD output and the SPAD output (e.g., output of the SPAD array 101) are sent to a ToF histogram generation circuit 107A to generate a histogram (also referred to as a ToF histogram). Methods for generating a histogram using a SPAD array and a reference SPAD array are known in the art, details are not repeated. For example, U.S. 20170115381 discloses circuits and methods for generating histogram using a SPAD array and a reference SPAD array. U.S. 20170115381 is incorporated by reference herein.

In the example of FIG. 1, the ToF histogram generation circuit 107A is part of the processing unit 107. The processing unit 107 also includes a processor 107B, which receives and processes the histogram. The processor 107B may be, e.g., a micro-controller, a digital signal processor (DSP), an Application-Specific Integrated Circuit (ASIC), or the like. The processor 107B processes the histogram to extract useful information, such as number of target(s) in the histogram, the distance of each target, and so on. In an example embodiment, the processor 107B is configured to execute one or more of the methods disclosed hereinafter to estimate the distance of a closest target (e.g., a target having a shortest distance from the ToF ranging system 100). In some embodiments, the ToF histogram generation circuit 107A and the processor 107B are integrated together in a same semiconductor die (e.g., as a single integrated-circuit (IC) die). In other embodiments, the ToF histogram generation circuit 107A and the processor 107B are formed in different (e.g., separate) semiconductor dies. These and other variations are fully intended to be included within the scope of the present disclosure.

FIG. 1 illustrates a cross-talk signal 106C, which represents light signal reflected by the cover glass 113 and received by the SPAD array 101. Cross-talk signal detection and removal from the histogram is known in the art, details are not discussed here. The methods discussed herein assume that the histogram being processed for detecting the closest target is free or substantially free of cross-talk signal, which may be achieved by removing the cross-talk signal from the histogram using methods known and used in the art.

The components used for emitting light signals, receiving reflected light signals, and generating the histogram, which includes the light source 103, the SPAD array 101, the reference SPAD array 101R, and the ToF histogram generation circuit 107A, are collectively referred to as an ToF imager (also referred to as a ToF sensor), in some embodiments. Therefore, the ToF ranging system 100 includes the ToF imager and the processor 107B, and the processor 107B processes the histogram generated by the ToF imager.

FIG. 1 illustrates the light source 103, the SPAD array 101, the reference SPAD array 101R, and the processing unit 107 as separate components attached to the substrate 109. This is merely a non-limiting example. In some embodiments, the light source 103, the SPAD array 101, the reference SPAD array 101R, and the ToF histogram generation circuit 107A are integrated into a single IC die as an integrated ToF imager. In some embodiments, the light source 103, the SPAD array 101, the reference SPAD array 101R, the ToF histogram generation circuit 107A, and the processor 107B are integrated into a single IC die as an integrated ToF ranging system. These and other variations are fully intended to be included within the scope of the present disclosure.

Figure 2:
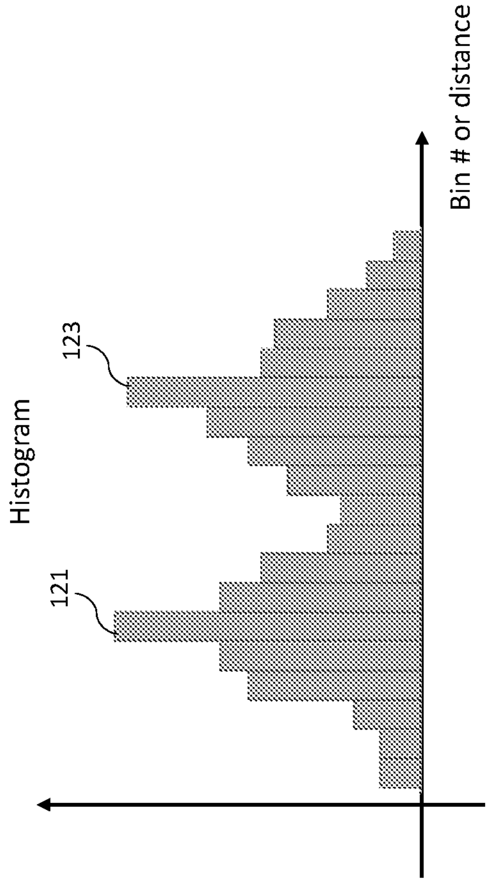
FIG. 2 illustrates a histogram generated by a ToF imager, in an embodiment.

FIG. 2 illustrates a histogram generated by a ToF imager, in an embodiment. The histogram in the example of FIG. 2 has a plurality of bins (also referred to as histogram bins). The value of each bin (e.g., along y-axis) of the histogram represents the signal count within a duration (e.g., a fixed duration) of the bin. The location (e.g., along x-axis), or the index number, of each bin of the histogram corresponds to a distance (or a narrow range of distance) from the SPAD array 101. During histogram processing, when a target is identified as being located in a histogram bin, the distance of that histogram bin is used as the distance of the target (e.g., distance between the SPAD array 101 and the target). In the discussion herein, it is assumed that the light source 103 and the SPAD array 101 are co-located such that the distance between the SPAD array 101 and the target is considered the same as the distance between the light source 103 and the target.

For ease of discussion, each bin of the histogram is assigned a distance (e.g., a distance corresponding to the center of the bin), and the distance corresponding to a bin is also referred to as the distance of the bin, or bin distance. The index of the bin, also referred to as bin index or bin number, may be used to indicate the distance of the bin. For example, assuming that the first bin (e.g., the leftmost bin, or the earliest bin) of the histogram has an index of 1, the second bin has an index of 2, and so on, then the distance of the i-th bin may be calculated as $((i-1)+0.5)D$, where D is the distance traveled by the light signal during a duration that is equal to half of a time interval T, and the time interval T is the duration of a histogram bin. The distance D is also referred to as the bin width. Note that the time interval T represents a round-trip time of the light signal. In the example of FIG. 2, the histogram includes two peaks 121 and 123, which may be caused by two targets located at different distances from the ToF imager.

Figure 3:
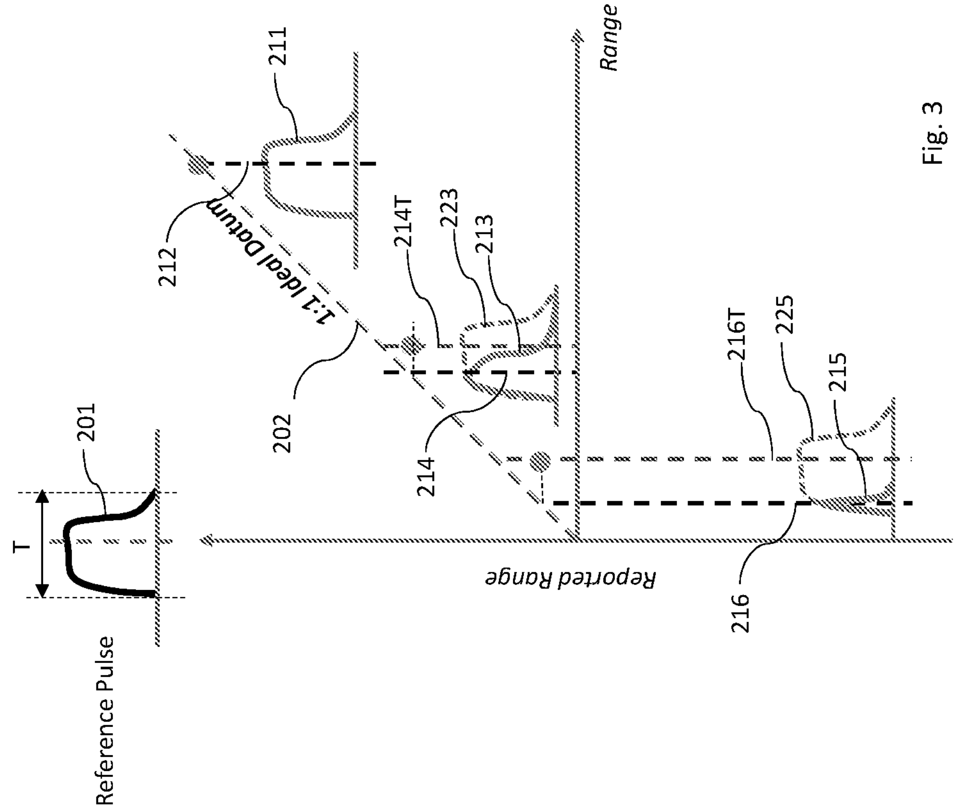
FIG. 3 illustrates challenges in target distance estimation due to limitation in the receiver bandwidth, in some embodiments.

FIG. 3 illustrates challenges in target distance estimation due to limitation in the receiver bandwidth, in some embodiments. In FIG. 3, the x-axis represents range (e.g., distance) of the target, and the y-axis represents the reported range by a reference ToF ranging system. The reference ToF ranging system is a ToF ranging system without using the disclosed methods herein, and serves as a performance comparison to the ToF ranging systems (or methods) disclosed herein.

In the example of FIG. 3, the distance of a single target is being determined by the reference ToF ranging system. A reference pulse shape 201 is illustrated in FIG. 3, which represents the shape of the light pulse transmitted by the ToF imager. FIG. 3 further illustrates three histograms 211, 213, and 215, which are the histograms of the reflected light signal when the target is at a long distance (e.g., 1000 mm away), a short distance (e.g., 100 mm away), and a very close distance (e.g., 10 mm away), respectively. Note that in FIG. 3, the histograms 211, 213, and 215 are illustrated as curves instead of bars, which curves are the envelopes of the respective bar-shaped histograms, as skilled artisans readily appreciate. In addition, in each of the histograms 211, 213, and 215, only the portion of the histogram containing the pulse (also referred to as a received pulse region) corresponding to reflection from the target is shown, and other portions of the histogram, such as portions containing random noise (e.g., shot noise) are plotted as a flat line (e.g., having a zero value) for simplicity.

To determine the distance of the target, the reference ranging system identifies the received pulse region of the histogram, finds the histogram bin in which the median position of the received pulse region falls, and reports the bin distance of the histogram bin found above as the distance of the target. Here, the median position of the received pulse region refers to a position that has an equal number of signal events (e.g., avalanche current events) before and after, and may be determined (e.g., approximated) as the middle point between the starting and ending positions of the received pulse region of the histogram.

As illustrated in FIG. 3, when the target is at a long distance, a small portion of the transmitted light signal is reflected back, and the reflected photons from the target arrives at the ToF sensor at a low rate. As a result, the bandwidth of the SPAD array is not a limiting factor for detecting the reflected photons. Therefore, the shape of the histogram 211 is substantially the same as the reference pulse shape 201. In other words, there is little or no distortion between the reference pulse shape 201 and the shape of the received pulse region of the histogram 211. In this rather ideal case, the distance of the median position (indicated by the dashed line 212) of the received pulse region gives an accurate estimate of the distance of the target, as indicated by the dot on the dashed line 212. Note that the dot is also on the dashed line 202 having a 45-degree angle, which represents the ideal output of Y=X.

When the target is at a short distance, the reflected photons arrive at a faster rate. The bandwidth of the SPAD array may limit the detection of the photons. For example, if two photons arrive at a SPAD at two different time instants separated by a duration smaller than the deadtime of the SPAD, the first photon may be detected, while the second photon may not be detected due to the deadtime of the SPAD after the first photon is detected. Effects of the bandwidth the SPAD array are discussed hereinafter in more detail with reference to FIG. 5.

Due to the limited receiver bandwidth of the SPAD array, the shape of the received pulse region of the histogram 213 is distorted compared with the reference pulse shape 201. In some embodiments, the received pulse region of the histogram 213 has a shorter width compared with an ideal received pulse shape 223 (which is the same as the reference pulse shape 201), which ideal received pulse shape 223 is illustrated in dashed line. The median position of the received pulse region of the histogram 213, as illustrated by the dashed line 214, corresponds to a distance that is smaller than the distance of the median position (illustrated by the dashed line 214T) of the ideal received pulse shape 223. In other words, for short distance ranging, the reference ToF ranging system underestimates the distance of the target. The estimated distance generated by the reference ToF ranging system is indicated by the dot on the dashed line 214T, which is below the 45-degree angled dashed line 202 representing the ideal (e.g., correct) distance estimation.

When the target is at a very close distance, the reflected photons arrive at an even faster rate. The bandwidth of the SPAD array may further limit the detection of the reflected photons, resulting even more distortion in the received pulse region of the histogram 215. The corresponding ideal received pulse shape 225 is illustrated in dashed lines. The median positions of the pulse region of the histogram 215 and the ideal received pulse shape 225 are illustrated by dashed lines 216 and 216T respectively. In this case, the reference ToF ranging system may seriously underestimate the target distance, which is shown as the dot on the dashed line 216T. Note that the vertical distance between the dot on the dashed line 216T and the 45-degree angled dashed line 202 is larger than the vertical distance between the dot on the dashed line 214T and the dashed line 202.

Note that although the bandwidth limitation of the SPAD array may distort the received pulse shape (e.g., shape of the received pulse region of the histogram), the location of the rising edge of the received pulse region of the histogram 213 (or 215) still overlaps with (e.g., is the same as) the respective rising edge of the ideal received pulse shape. In other words, the location (e.g., bin index) of the rising edge of the received pulse region is not affected by the distortion in the received pulse region. This important observation of characteristics is utilized in the methods disclosed herein to estimate the distance of a closest target with immunity to pulse shape distortion. The methods disclosed herein overcome the various challenges faced by the reference ToF ranging system. Details are discussed hereinafter.

Figure 4C:
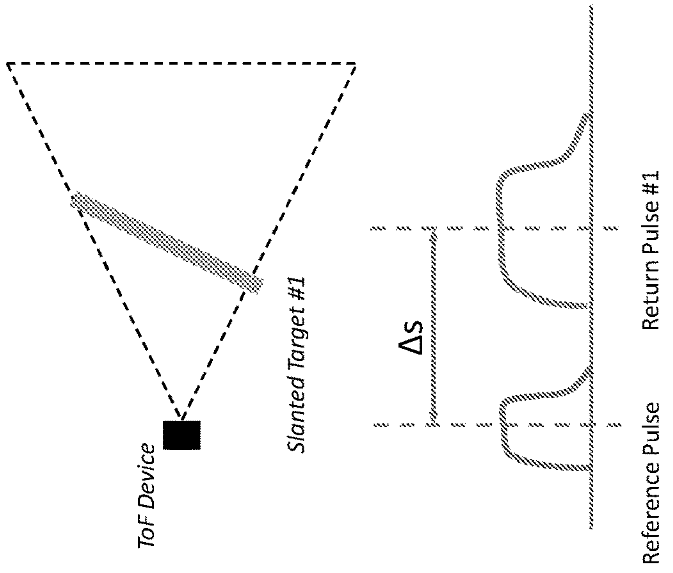
FIGS. 4A-4C illustrate challenges in target distance estimation, in other embodiments.
Figure 4B:
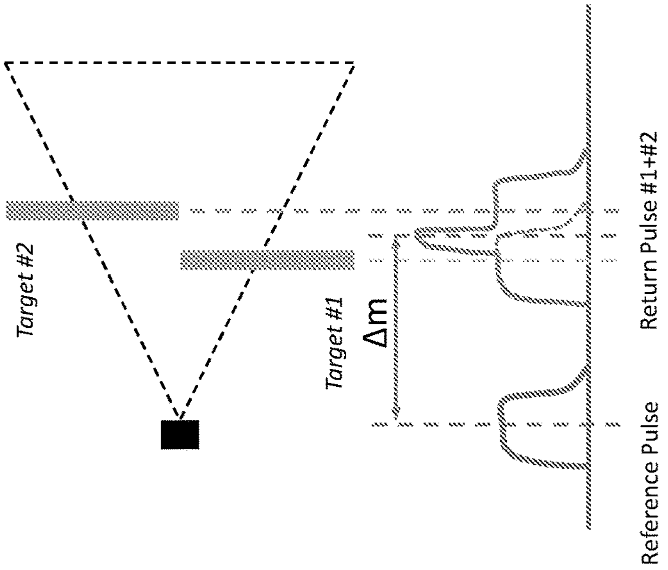
Figure 4A:
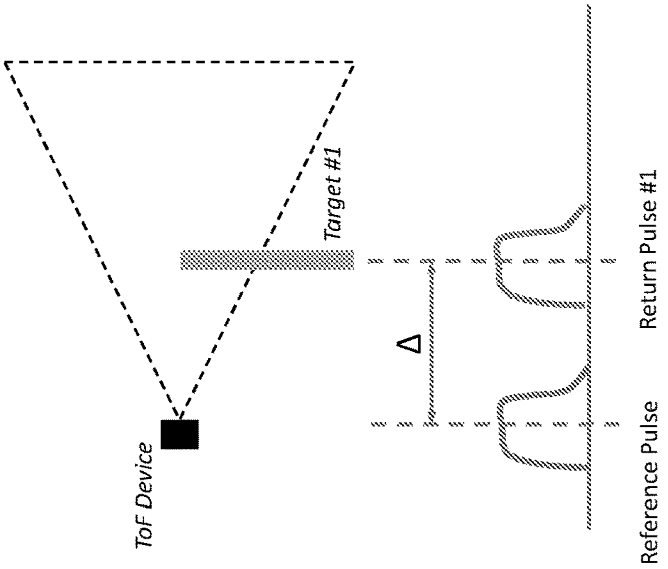

FIGS. 4A-4C illustrate challenges in target distance estimation, in other embodiments. FIG. 4A illustrates a baseline scenario with a single target, where a ToF device (e.g., a ToF imager or ToF ranging system) transmits a light signal toward the single target and generates a histogram based on the reflected light signal. The transmitted light pulse and the received pulse region of the histogram are shown in FIG. 4A and labeled as "Reference Pulse" and "Return Pulse #1," respectively. The distance (e.g., measured in millimeters or meters) of the median position of the Return Pulse #1, which is proportional to the time difference $\Delta$ between the median position of the Reference Pulse and the median position of the Return Pulse #1, gives an accurate estimate of the distance of the single target.

In FIG. 4B, two targets labeled as "Target #1" and "Target #2" are closely spaced. The reflected light pulses from both targets merge to form a merged received pulse region in the histogram, which is labeled as "Return Pulse #1+#2." The distance of the median position of the merged received pulse region, which is proportional to the time difference $\Delta_m$ between the median position of the Reference Pulse and the median position of the merged received pulse region, may give a distance estimate somewhere between Target #1 and Target #2. This means that the reference ToF ranging system may not be able to distinguish the two targets, and the estimated distance of target is not an accurate estimate of either target's distance. While it is possible to develop algorithms to distinguish the two targets contained in the histogram and estimate the distance of each target separately, such algorithms are typically complex, and may be difficult to be implemented in hardware or as software algorithms. However, in many applications, only the distance of the closest target is of interest. For such applications, it may be advantageous to develop simple algorithms that give accurate estimate of the distance of the closest target, such simple algorithms may be easily implemented in hardware or as software, and may reduce the power consumption of the implementation.

In FIG. 4C, there is only one target, but the target is slanted such that different portions of the target are at different distances from the ToF device. As a result, the histogram may include a received pulse region (labeled as "Return Pulse #1" in FIG. 4C) that is longer than the reference pulse shape. The distance estimate based on the median position of the Return Pulse #1 may more or less give the middle point of the target. However, in many applications, only the closest point of the slanted target is of interest.

In both FIGS. 4B and 4C, although the number of targets and the position of the target(s) distort the received pulse shape, the location of the rising edge of the merged received pulse region in FIG. 4B (or the stretched received pulse region in FIG. 4C) remain unchanged from that of the ideal received pulse shape. This observation is consistent with that of FIG. 3. As discussed hereinafter, based on these observations, the rising edge in a first received pulse region of the histogram is identified and used to get an estimate of the distance of the closest target.

Figure 5:
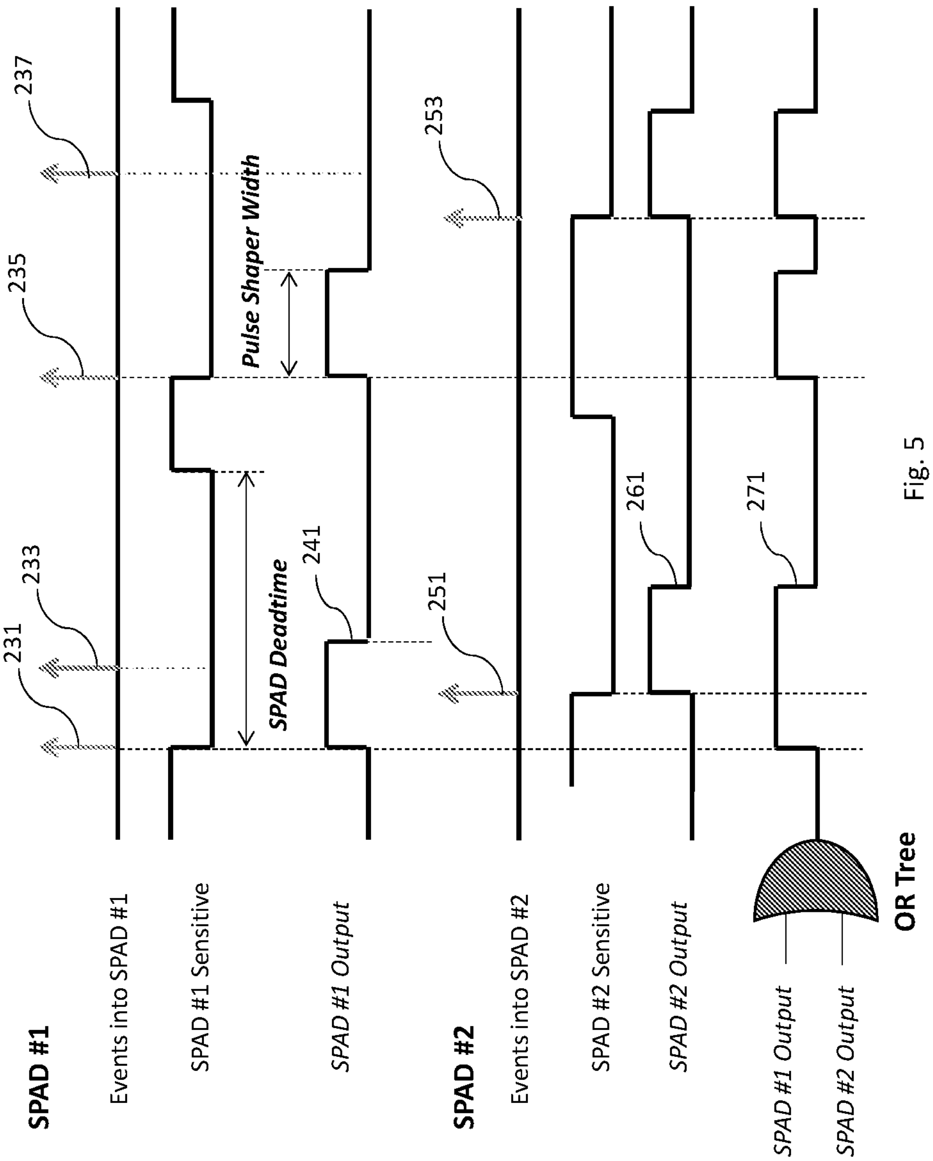
FIG. 5 illustrates the pile-up issue in a SPAD array, in some embodiments.

FIG. 5 illustrates the pile-up issue in a SPAD array, in some embodiments. Pile-up occurs due to the deadtime of the SPADs in the SPAD array, and/or due to the structure (e.g., the OR tree used in) the SPAD array. In FIG. 5, two SPADs (labeled as "SPAD #1" and "SPAD #2") in a SPAD array are illustrated. For SPAD #1, a plurality of reflected photons arrive at time instants 231, 233, 235, and 237, which time instants are shown as arrows. The SPAD #1 is sensitive (e.g., ready to detect photon) prior to time instant 231, as indicated by the logic high state of the signal labeled as "SPAD #1 Sensitive." At time instant 231, a photon arrives and causes an avalanche current event, and the SPAD #1 generates an output pulse 241 in the SPAD output signal labeled as "SPAD #1 Output". One skilled in the art will readily appreciate that after an avalanche current event happens in a SPAD, the SPAD is not able to detect photon for a period of time, which period of time is referred to as the deadtime of the SPAD. The deadtime is illustrated by the logic low state of the SPAD #1 Sensitive signal. Note that the photon arriving at time instant 233 falls within the deadtime of the SPAD #1, and therefore, is not detected and does not generate a SPAD output. The photon arriving at time instant 235 is outside the previous deadtime of the SPAD #1, and therefore, generates a SPAD output (e.g., a pulse in SPAD #1 Output signal). The photon arriving at time instant 237 is inside the previous deadtime of the SPAD #1, and therefore, does not generate a SPAD output.

For the SPAD #2, two photons arrive at time instants 251 and 253 that are separated by a duration longer than the deadtime of the SPAD #2, and therefore, each of the photons generates an output pulse in the SPAD #2 Output signal.

FIG. 5 further illustrates an OR tree in the SPAD array, which OR tree includes one or more logic OR gates that perform the logic OR operation on outputs from all of the SPADs in a SPAD array. The output of the OR tree is used as the output of the SPAD array, in some embodiments. Note that the output pulse 241 from SPAD #1 overlaps in time with the output pulse 261 from SPAD #2, and as a result, the two output pulses 241 and 261 are merged together by the OR tree to form a merged pulse 271 that is longer than the output pulses 241 and 261. It may be worth noting that histogram readouts typically detect rising edges of the pulses, and therefore, only one event is recorded from this elongated pulse comprised of two merged SPAD pulses.

As discussed above, the deadtime of the SPADs and the OR tree in the SPAD array may cause some photons to be missed (e.g., not detected or counted), and may cause distortion of the output pulses of the SPADs. This is referred to as the pile-up issue. Pile-up may distort the received pulse shape in the histogram, and may cause challenges for target detection and/or target distance estimation for ToF ranging systems. The currently disclosed ToF ranging system 100, by using the various methods disclosed herein, can overcome the pile-up issue and generate accurate estimates for the distance of the closest target.

Various methods are discussed below that generate estimate of the closest target. The processing of the various methods may include the following steps. First, a rising edge in the histogram that corresponds to the rising edge of a reflected light pulse from the closest target is identified. For ease of discussion, the rising edge in the histogram that corresponds to the rising edge of a reflected light pulse from the closest target may also be referred to as the anchor rising edge.

The reflected light pulse from a target generates a corresponding received pulse region in the histogram, in some embodiments. The shape of the received pulse region in the histogram may or may not be distorted compared with the shape of the transmitted light pulse. In addition, reflected light pulses from closely spaced targets may merge together, thereby generating a longer pulse region in the histogram. However, as discussed above, the location of the rising edge of the received pulse region is not changed even when the shape of the received pulse region is distorted for the various reasons discussed above. Note that the rising edge of the first (e.g., earliest) received pulse region of the histogram corresponds to the rising edge of the earliest-arriving reflected light pulse, which earliest-arriving reflected light pulse is reflected from the closest target. Therefore, the rising edge of the first received pulse region of the histogram can be found and used as the anchor rising edge.

The position of the anchor rising edge may be found by different methods. For example, the gradient of the histogram at each histogram bin is calculated, e.g., by computing the differences between adjacent histogram bins and using the computed differences as the gradients of respective histogram bins. The first histogram bin (e.g., the leftmost histogram bin, or the earliest histogram bin) having the maximum gradient value is considered to contain the anchor rising edge, and the distance of the first histogram bin is used as the distance of the anchor rising edge. As another example, the gradient of the histogram at each bin is calculated, the first histogram bin with a gradient value larger than a pre-determined threshold is considered to contain the anchor rising edge, and the distance of the first histogram bin is used as the distance of the anchor rising edge. The pre-determined threshold may be determined by an ambient noise level and a user-defined confidence level, details of which are discussed hereinafter.

After the location (e.g., distance) of the anchor rising edge is determined, a pre-determined offset $D_{OFF}$ is added to the distance of the anchor rising edge to form an estimate of the distance of the closest target. In some embodiments, the pre-determined offset $D_{OFF}$ is half of the transmitted light pulse width (measured in unit of distance). For example, denote the duration of the transmitted light pulse as T (see, e.g., duration T of the reference pulse shape 201 in FIG. 3), and the speed of light as C, then $D_{OFF}=0.5\times T\times C$.

Note that the pre-determined offset $D_{OFF}$ is determined by the shape of the transmitted light pulse produced by the light source 103 (e.g., a VCSEL device), which shape can be characterized (e.g., measured) beforehand, e.g., by a calibration process of the light source 103. In some embodiments, the pre-determined offset $D_{OFF}$ is determined beforehand, saved, and used later for calculating the distance of the closest target. Note that since the pre-determined offset $D_{OFF}$ is independent of the various factors that distorts the shape of the received pulse region in the histogram, the estimate of the distance of the closest target is robust and is immune to the distortion in the received pulse shape.

In some embodiments, the shape of the transmitted light pulse produced by the light source 103 varies with the temperature of the light source 103. To improve the accuracy of the estimate of the distance of the closest target, the shape of the transmitted light pulse may be characterized (e.g., measured) at a plurality of temperatures (e.g., covering all or a portion of the operating temperature range of the light source 103), and the pre-determined offset $D_{OFF}$ at the different temperatures may be saved, e.g., in a look-up table (LUT). During operation of the ToF ranging system, the present temperature of the light source 103 is determined, and the pre-determined offset $D_{OFF}$ at the present temperature may be determined using the stored values of the pre-determined offset $D_{OFF}$. For example, a simple LUT method finds a temperature in the LUT that is closest to the present temperature, and uses the corresponding stored pre-determined offset $D_{OFF}$ as the pre-determined offset $D_{OFF}$ at the present temperature. As another example, an interpolation (e.g., liner interpolation) may be performed using the stored values of the pre-determined offset $D_{OFF}$ at different temperatures to generate an interpolated value for the pre-determined offset $D_{OFF}$ at the present temperature.

After the estimate of the distance of the closest target is formed, the estimate may be fine-tuned by adding an adjustment term. This adjustment term may be calculated based on values of the histogram bins, and may provide adjustment to the estimate of the distance by a fraction of the bin width D. Details of the adjustment term are discussed hereinafter. In some embodiments, the fine-tuning step is omitted.

Various embodiment methods for estimating the distance of the closest target using a ToF ranging system are discussed below. These methods may be performed by the processor 107B of the ToF ranging system 100.

Figure 6:
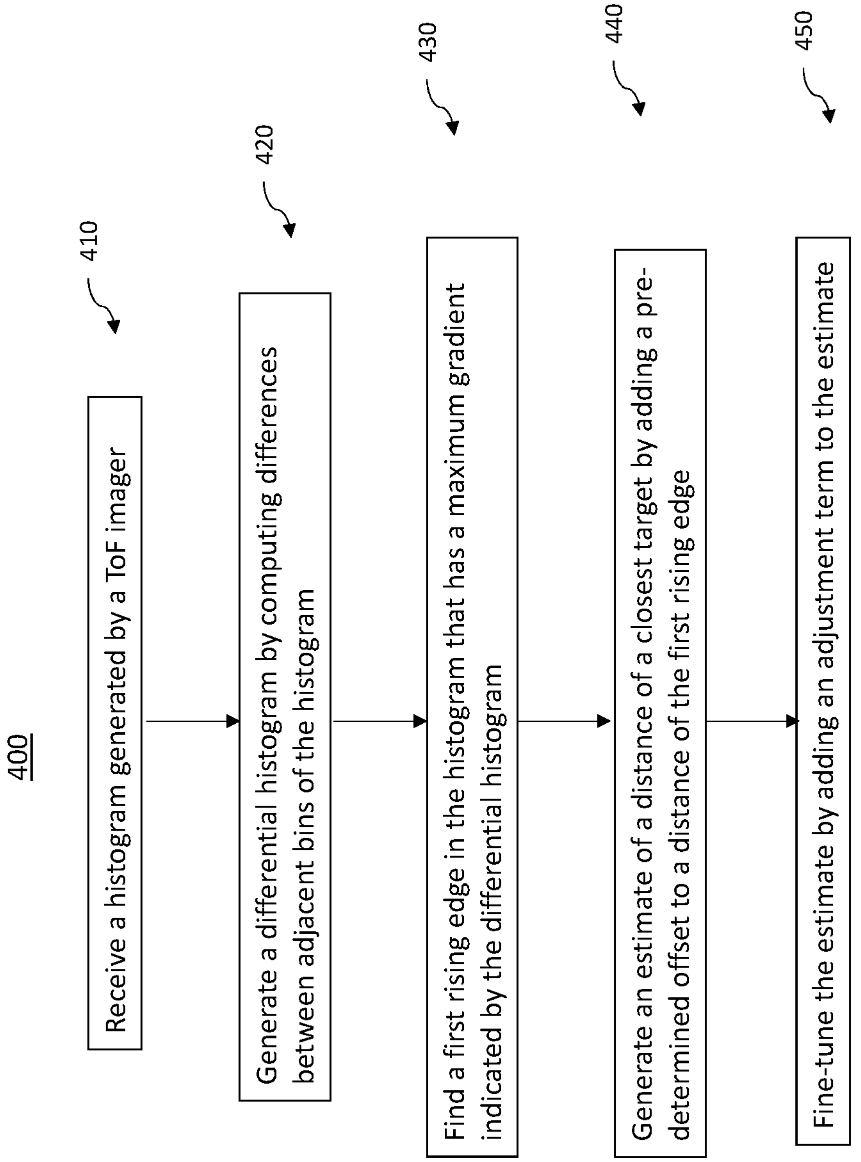
FIG. 6 illustrates a method of estimating the distance of a closest target, in an embodiment.

FIG. 6 illustrates a method 400 of estimating the distance of a closest target, in an embodiment. It should be understood that the embodiment method shown in FIG. 6 is merely an example of many possible embodiment methods. One of ordinary skill in the art would recognize many variations, alternatives, and modifications. For example, various steps as illustrated in FIG. 6 may be added, removed, replaced, rearranged, or repeated.

Referring to FIG. 6, at block 410, a histogram generated by a ToF imager is received, e.g., by the processor 107B. At block 420, a differential histogram is generated by computing differences between adjacent bins of the histogram. The computed differences are assigned to respective bins of the differential histogram. For example, denoted the value of the i-th bin of the histogram as H(i), and denote the value for the i-th bin of the differential histogram as DH(i), then DH(i) may be calculated as $DH(i)=H(i)-H(i-1)$. In some embodiments, assuming the index of the histogram bins starts from 1, a zero value is assigned to DH(1), such that the differential histogram has the same length (e.g., same number of histogram bins) as the histogram, and there is a one-to-one correspondence between the histogram bins of the histogram and the histogram bins (also referred to as bins) of the differential histogram. The value of the i-th bin of the differential histogram is an approximation of (e.g., proportional to) the gradient of the histogram at the i-th bin of the histogram, in some embodiments.

Next, at block 430, a first rising edge in the histogram is found that has a maximum gradient indicated by the differential histogram. The first rising edge is located in the earliest or the leftmost bin of the histogram that has the maximum gradient. In some embodiments, to find the first rising edge, the maximum value (e.g., the maximum gradient value) of the values of the bins of the differential histogram is determined, and the first bin (e.g., leftmost bin) of the differential histogram having the maximum value is identified. The bin index of the first bin of the differential histogram is used to indicate the location (or equivalently, the distance) of the first rising edge in the histogram.

Next, at block 440, an estimate of the distance of the closest target is determined by adding a pre-determined offset to the distance of the first rising edge. As discussed above, the pre-determined offset $D_{OFF}$ is determined by the shape of the transmitted light pulse. In addition, temperature compensation for the pre-determined offset $D_{OFF}$ may be performed, e.g., by a LUT method or an interpolation method, to generate the pre-determined offset $D_{OFF}$ for the present temperature of the light source 103.

Next, at block 450, the estimate obtained in block 440 is fined-tuned by adding an adjustment term to the estimate. The adjustment term is calculated using the value of the bin of the differential histogram containing the first riding edge, and using values of the bins of the histogram around the first rising edge, in some embodiments. For example, assuming that from block 430, it is determined that the first rising edge is in the m-th bin of the histogram, then the adjustment term, denoted as $D_{ADJ}$, is calculated as $D_{ADJ}$=DH(m)/(H(m)+H (m+1)). Note that the notations of H (m) and DH (m) represent the values of the m-th bin of the histogram and the differential histogram, respectively. The fine-tuning in block 450 is optional, and is omitted in some embodiments.

The adjustment term $D_{ADJ}$ is calculated by dividing DH(m) by the sum of H(m) and H(m+1). In other words, the adjustment term $D_{ADJ}$ takes into consideration of the shape of the histogram around the first rising edge, and therefore, is able to provide a fine adjustment in distance that is smaller than the bin width D, thus improving the accuracy of the estimate of the distance of the closest target.

Figure 7:
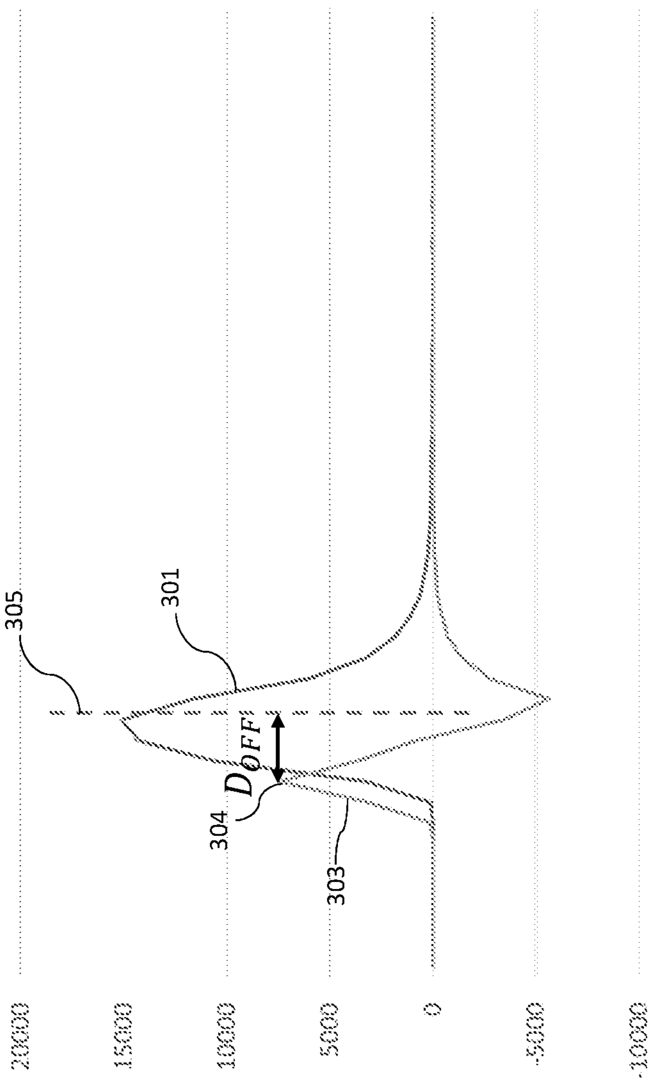
FIG. 7 illustrates a histogram and a corresponding differential histogram, in an embodiment.

FIG. 7 illustrates a histogram and a corresponding differential histogram, in an embodiment. In FIG. 7, the curve 301 shows a histogram from the ToF imager, and the curve 303 shows the corresponding differential histogram generated from the histogram 301. Note that in FIG. 7, the curve 301 and the curve 303 show the envelopes of the histogram and the differential histogram, respectively. The envelope of a histogram may be plotted by connecting the middle points of all the histogram bins. In the example of FIG. 7, the curve 303 has a maximum value at location 304, which corresponds to the location of the first rising edge in block 430 of FIG. 6. In the illustrated embodiment, the first rising edge is the rising edge of the first received pulse region of the histogram. The dashed vertical line 305 in FIG. 7 illustrates a location that corresponds to the location of the first rising edge shifted by a pre-determined offset $D_{OFF}$. Therefore, the dashed vertical line 305 indicates the estimated location (or distance) of the closest target, as computed in block 440 of FIG. 6.

Figure 8B:
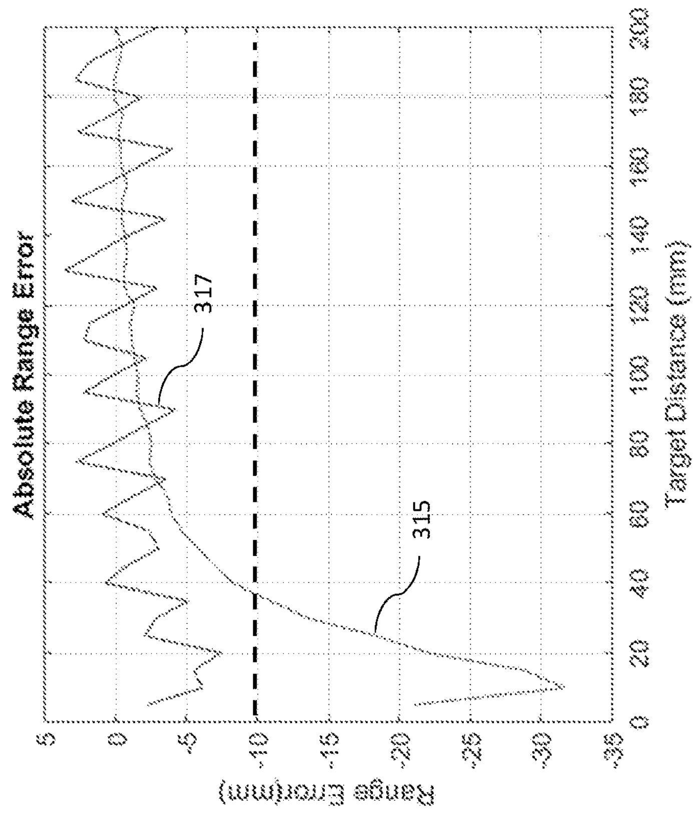
FIGS. 8A and 8B illustrate performance of the method in FIG. 6, in an embodiment.
Figure 8A:
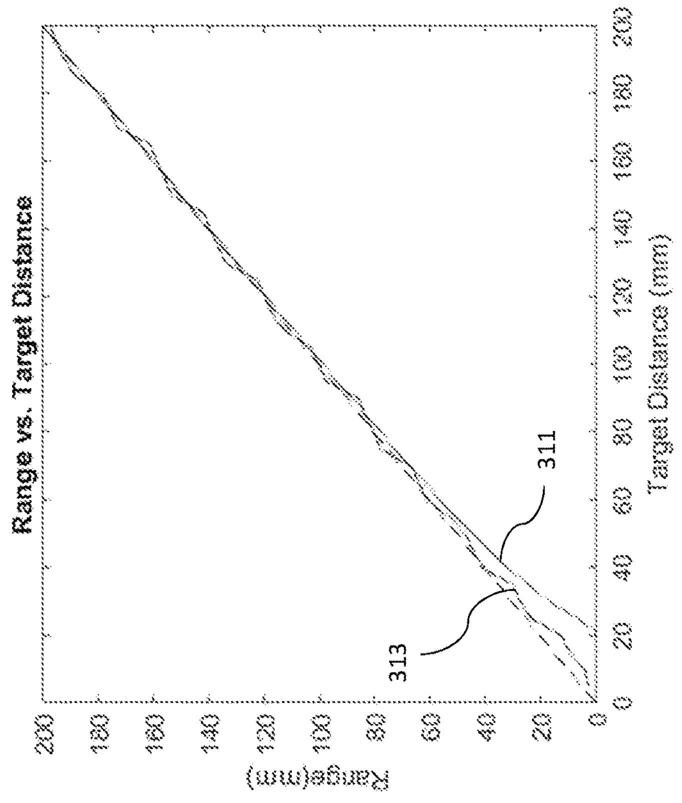

FIGS. 8A and 8B illustrate performance of the ToF ranging system 100 using the method in FIG. 6, in an embodiment. A single target is simulated, and the power of the light source 103 is set to a high level to simulate situations where the received light pulses are distorted by the limitation of the bandwidth of the SPAD array.

In FIG. 8A, the x-axis is the target distance, the y-axis is the range reported by the ToF ranging system. The curve 313 illustrates the performance of the ToF ranging system 100 using the method of FIG. 6. For comparison, curve 311 in FIG. 8A shows the performance of the reference ToF ranging system, which uses the median position of the received pulse shape (which may be distorted) as the estimated distance of the target. The dashed line with a 45-degree angle in FIG. 8A shows the performance of an ideal ranging system (y=x). FIG. 8B illustrates the value of the error in the reported distance (e.g., along the y-axis) versus the target distance (e.g., along the x-axis). The curves 317 and 315 show the performance of the ToF ranging system 100 using the method of FIG. 6 and the performance of the reference ToF ranging system, respectively.

As illustrated in FIGS. 8A and 8B, the reference ToF ranging system underestimates the distance of the target at short distances, whereas the ToF ranging system 100 using the method of FIG. 6 achieves much better performance at short distances. When the target is at long distance, the received pulse shape in the histogram has little distortion for this simple scenario, and both ranging systems achieve good performance.

Figure 9:
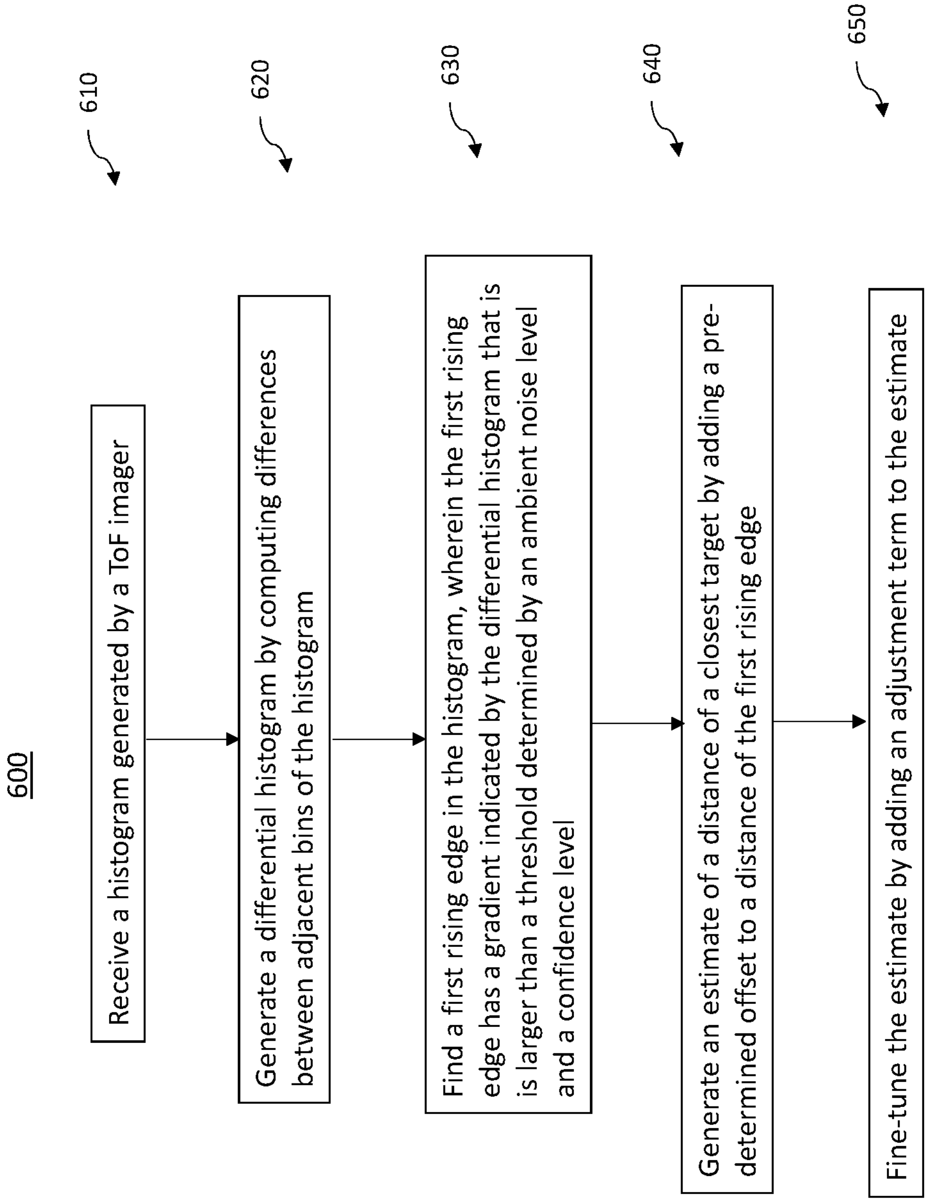
FIG. 9 illustrates a method of estimating the distance of a closest target, in another embodiment.

FIG. 9 illustrates a method of estimating the distance of a closest target, in another embodiment. It should be understood that the embodiment method shown in FIG. 9 is merely an example of many possible embodiment methods. One of ordinary skill in the art would recognize many variations, alternatives, and modifications. For example, various steps as illustrated in FIG. 9 may be added, removed, replaced, rearranged, or repeated.

The processing of the method in FIG. 9 is similar to that of FIG. 6, but the first rising edge is found using a different approach in block 630. In other words, the processing in blocks 610, 620, 640, and 650 are the same as those in blocks 410, 420, 440, and 450, thus details are not repeated. The processing of block 630 is discussed below.

In block 630, a first rising edge of the histogram is found, where the first rising edge has a gradient indicated by the differential histogram that is larger than a threshold, which threshold is determined by an ambient noise level and a user-defined confidence level (e.g., a user-defined scale factor). In an embodiment, to find the location of the first rising edge, the values of the bins of the differential histogram are compared with the threshold, and the first bin (e.g., leftmost bin) of the differential histogram having a value larger than the threshold is identified. The bin index of the first bin of the differential histogram is used to indicate the location (or equivalently, the distance) of the first rising edge in the histogram.

As an example, the threshold used in block 630 may be determined as described below. Denote the ambient events (e.g., avalanche current events caused by ambient light signal) per histogram bin as $\sigma^2$, and denote the user-defined confidence level as C, then the threshold TH is calculated as $TH=C\times\sqrt{2\times\sigma^2}$. Note that in the above calculation, the ambient events per bin of the differential histogram is considered as twice of the ambient noise events per bin of the histogram (due to the subtraction operation used for calculating the differential histogram doubling the power of the ambient events level). The noise from these two bins is then the square root of twice the ambient events per bin due to the shot noise characteristics of light. The ambient noise events per histogram bin may be measured beforehand using a calibration process, or may be measured periodically during operation of the ToF ranging system. The user-defined confidence level C may be adjusted in accordance with the ambient noise level to achieve reliable detection of the first rising edge. For example, the user-defined confidence level C may be increased if the ambient noise level increases, or vice versa, in order to avoid false detection of the first rising edge and to achieve a target detection rate for the first rising edge. Besides the method discussed above, other suitable methods for determining the threshold used in the processing of block 630 are also possible, and are fully intended to be included within the scope of the present disclosure.

Figure 10A:
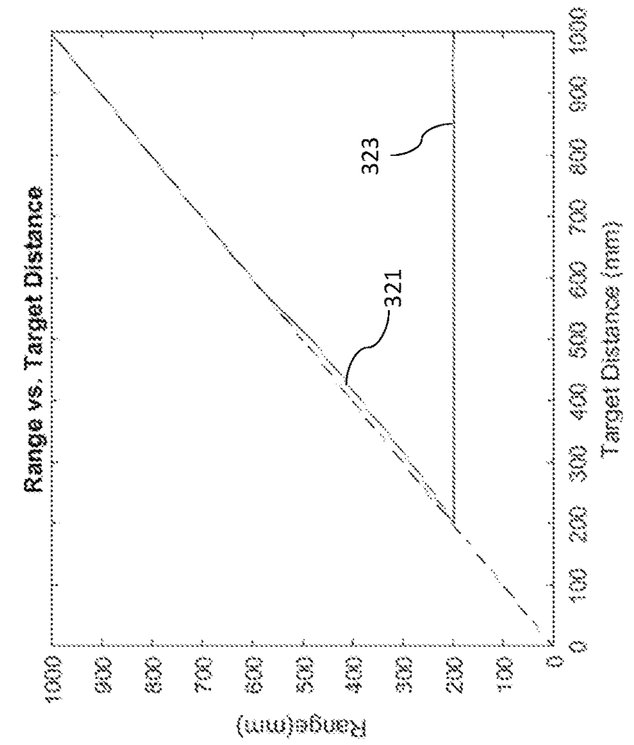
FIGS. 10A and 10B illustrate performance of the method in FIG. 9, in an embodiment.
Figure 10B:
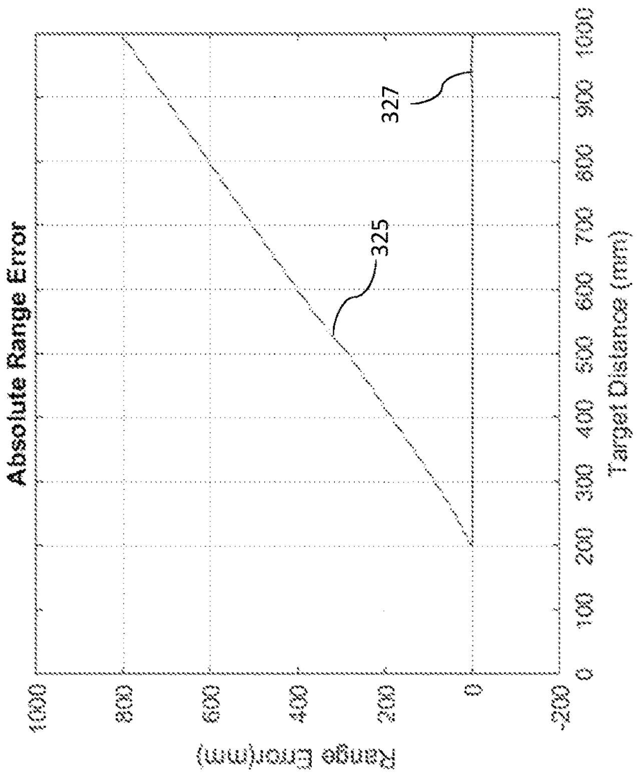

FIGS. 10A and 10B illustrate performance of the ToF ranging system 100 using the method in FIG. 9, in an embodiment. In FIGS. 10A and 10B, two targets are simulated in the simulation. A first target is fixed at 200 mm from the ToF ranging system 100, and a second target sweeps from a distance of 200 mm to 1 m over time. The reflectance of the second target is double of that of the first target. FIG. 10A shows the target distance along the x-axis and the reported range along the y-axis. In FIG. 10A, the curve 323 shows the performance of the ToF ranging system 100 using the method of FIG. 9, and the curve 321 shows the performance of the reference ToF ranging system (same reference ToF ranging system as in FIGS. 8A and 8B). In FIG. 10B, the curves 327 and 325 show the performance of the ToF ranging system 100 using the method of FIG. 9 and the performance of the reference ToF ranging system, respectively.

As illustrated in FIGS. 10A and 10B, the ToF ranging system 100 using the method of FIG. 9 is able to lock on to the first target (e.g., the closest target) throughout the simulation and report correct distance of the closest target, whereas the reference ToF ranging system is affected by the reflected light pulse from the second moving target, and as a result, the reported range changes over time with the movement of the second target.

Figure 11:
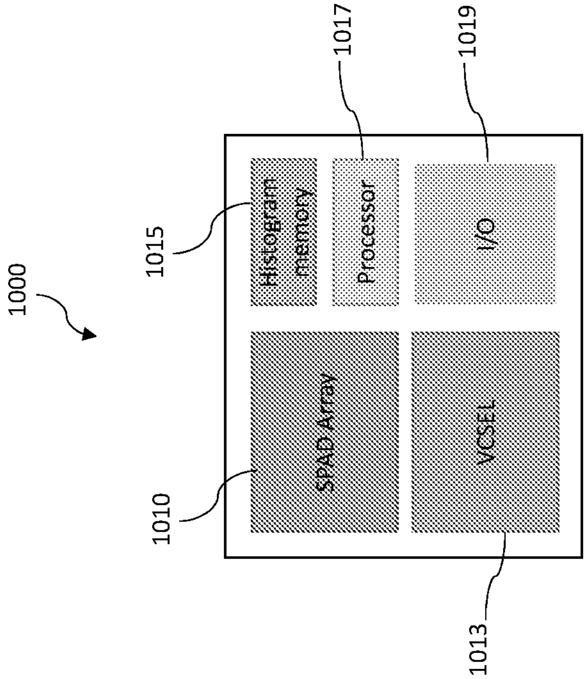
FIG. 11 illustrates an integrated circuit (IC) device formed as a ToF ranging system, in an embodiment.

FIG. 11 illustrates an integrated circuit (IC) device 1000 formed as a ToF ranging system, in an embodiment. The IC device 1000 may be formed as the ToF ranging system 100 of FIG. 1. Note that for simplicity, not all features of the IC device 1000 are illustrated. The IC device 1000 includes a light source 1013 (e.g., a VCSEL, an LED, or the like) and a SPAD array 1010. The light source 1013 may correspond to the light source 103 in FIG. 1. The SPAD array 1010 may correspond to the SPAD array 101 and reference SPAD array 101R in FIG. 1, and may additionally include the ToF histogram generation circuit 107A of FIG. 1.

The IC device 1000 further includes a memory module 1015 for storing the histogram generated by the SPAD array 1010. Notably in FIG. 11, a processor 1017 is integrated in the IC device 1000, which processor 1017 may correspond to the processor 107B in FIG. 1 and may be configured to perform one or more of the methods disclosed herein to generate an estimate of the distance of the closest target. The IC device 1000 may further include an input/output (I/O) module 1019 for communication with other devices.

Note that the various methods for closest target distance estimation are simple to implement, and require very little computational power. These advantages allow many different types of processors to be easily and economically integrated into the IC device 1000 as the process 1017, and no off-chip processing of the histogram by another processor is needed. The on-chip processing of the histogram data significantly reduces the chip complexity related to I/O transfer of histogram data to an off-chip processing module, and reduces the processing delay related to off-chip processing.

Disclosed embodiments may achieve advantages. For example, the various disclosed methods provide accurate estimate of the closest target, and is robust against distortions in the received pulse shape. Temperature compensation may be performed to further improve the accuracy of the estimates. The adjustment term provides fine adjustment of distance smaller than the bin width. The disclosed methods are simple to implement and saves computational power, and as a result, allows a fully integrated ToF ranging system on a single IC device.

Example embodiments of the present invention are summarized here. Other embodiments can also be understood from the entirety of the specification and the claims filed herein.

Example 1. In an embodiment, a method of determining a distance of a closest target using a time-of-flight (ToF) ranging system includes: receiving, by a processor, a histogram generated by a ToF imager of the ToF ranging system, wherein the ToF imager is configured to transmit a light pulse for ranging purpose; finding a first rising edge in the histogram that corresponds to a rising edge of a reflected light pulse from the closest target; and calculating a first estimate of the distance of the closest target by adding a pre-determined offset to a distance of the first rising edge.

Example 2. The method of Example 1, wherein finding the first rising edge comprises: generating a differential histogram by computing differences between adjacent histogram bins of the histogram and assigning the computed differences as values of respective histogram bins of the differential histogram; and finding a first histogram bin of the differential histogram, wherein a first value of the first histogram bin of the differential histogram is larger than a pre-determined threshold, or is a maximum value of the values of the histogram bins of the differential histogram.

Example 3. The method of Example 2, wherein the first histogram bin is a leftmost histogram bin of the differential histogram that has the first value.

Example 4. The method of Example 3, wherein the pre-determined threshold is determined by an ambient noise level in the histogram and a user-specified confidence level.

Example 5. The method of Example 3, wherein the pre-determined offset is determined by a shape of the light pulse transmitted by the ToF imager, and corresponds to half of the transmitted light pulse width.

Example 6. The method of Example 5, further comprising performing a calibration process for the ToF imager, comprising: measuring the shape of the light pulse transmitted by the ToF imager at different temperatures; computing a plurality of values for the pre-determined offset at the different temperatures; and storing the plurality of values for the pre-determined offset at the different temperatures.

Example 7. The method of Example 6, further comprising: obtaining a measurement of a present temperature of the ToF imager; and determining a present value for the pre-determined offset based on the measurement of the present temperature and the stored plurality of values for the pre-determined offset at the different temperatures.

Example 8. The method of Example 7, wherein determining the present value for the pre-determined offset comprises determining the present value for the pre-determined offset by performing an interpolation using the measurement of the present temperature and the stored plurality of values for the pre-determined offset at the different temperatures.

Example 9. The method of Example 3, wherein the first histogram bin has a first bin index, wherein the method further comprises fine-tuning the first estimate of the distance of the closest target by adding an adjustment term to the first estimate, wherein the adjustment term is calculated based on the first value of the first histogram bin of the differential histogram, a second value of a second histogram bin of the histogram having the first bin index, and a third value of a third histogram bin of the histogram adjacent to the second histogram bin.

Example 10. The method of Example 9, further comprising computing the adjustment term, comprising: dividing the first value by a sum of the second value and the third value.

Example 11. In an embodiment, a method of operating a time-of-flight (ToF) ranging system includes: transmitting, by a light source of the ToF ranging system, light pulses toward one or more targets; receiving, by a ToF sensor of the ToF ranging system, the light pulses reflected by the one or more targets; generating a histogram based on the received light pulses; generating a differential histogram by computing differences between adjacent histogram bins of the histogram and assigning the computed differences as values of respective histogram bins of the differential histogram; finding a first histogram bin of the differential histogram, wherein a first value of the first histogram bin of the differential histogram is larger than a pre-determined threshold or is a maximum value of the values of the histogram bins of the differential histogram; and computing an estimate of a distance of a closest target by adding a pre-determined offset to a first distance of the first histogram bin.

Example 12. The method of Example 11, wherein the first histogram bin is a leftmost histogram bin of the differential histogram that has the first value.

Example 13. The method of Example 12, wherein the pre-determined offset is proportional to half of a width of a light pulse transmitted by the light source.

Example 14. The method of Example 13, wherein the width of the light pulse transmitted by the light source varies with temperature, wherein the method further comprises: measuring the width of the light pulse transmitted by the light source at different temperatures beforehand; measuring a present temperature of the light source; and calculating the pre-determined offset at the present temperature by performing an interpolation to generate an estimate of the width of the light pulse at the present temperature using the measured widths of the light pulse at the different temperatures.

Example 15. The method of Example 12, wherein the first histogram bin has a first bin index, wherein the method further comprises fine-tuning the estimate of the distance of the closest target by adding an adjustment term to the estimate, wherein the adjustment term is calculated based on the first value and values of the histogram bins of the histogram around the first bin index.

Example 16. The method of Example 12, wherein the pre-determined threshold is determined by an ambient noise level in the histogram and a user-specified scale factor.

Example 17. In an embodiment, a time-of-flight (ToF) ranging system includes: a light source configured to transmit light pulses for illuminating one or more targets; a ToF sensor configured to receive reflected light pulses from the one or more targets and to generate a histogram based on the reflected light pulses; a processor configured to determine a distance of a closest target of the one or more targets by: finding a first rising edge in the histogram that corresponds to a rising edge of a reflected light pulse reflected by the closest target; and calculating an estimate of the distance of the closest target by adding a pre-determined offset to a distance of the first rising edge.

Example 18. The ToF ranging system of Example 17, wherein finding the first rising edge comprises: computing differences between adjacent histogram bins of the histogram and assigning the computed differences as gradients of respective histogram bins of the histogram; and finding a first histogram bin of the histogram having a first value, wherein the first value is a maximum value of the computed differences, or is larger than a pre-determined threshold value.

Example 19. The ToF ranging system of Example 18, wherein the first histogram bin is a leftmost histogram bin of the histogram having the first value.

Example 20. The ToF ranging system of Example 19, wherein the pre-determined offset is proportional to half of a width of a transmitted light pulse.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of determining a distance of a closest target using a time-of-flight (ToF) ranging system, the method comprising:

receiving, by a processor, a histogram generated by a ToF imager of the ToF ranging system, wherein the ToF imager is configured to transmit a light pulse for ranging purpose;

finding a first rising edge in the histogram that corresponds to a rising edge of a reflected light pulse from the closest target, wherein finding the first rising edge comprises:

generating a differential histogram by computing differences between adjacent histogram bins of the histogram and assigning the computed differences as values of respective histogram bins of the differential histogram; and finding a first histogram bin of the differential histogram, wherein a first value of the first histogram bin of the differential histogram is larger than a pre-determined threshold, or is a maximum value of the values of the histogram bins of the differential histogram, wherein the first histogram bin is a leftmost histogram bin of the differential histogram that has the first value; and calculating a first estimate of the distance of the closest target by adding a pre-determined offset to a distance of the first rising edge, wherein the pre-determined offset is determined by a shape of the light pulse transmitted by the ToF imager and corresponds to half of the transmitted light pulse width.

2. The method of claim 1, wherein the pre-determined threshold is determined by an ambient noise level in the histogram and a user-specified confidence level.

3. The method of claim 1, further comprising performing a calibration process for the ToF imager, comprising:

measuring the shape of the light pulse transmitted by the ToF imager at different temperatures;

computing a plurality of values for the pre-determined offset at the different temperatures; and storing the plurality of values for the pre-determined offset at the different temperatures.

4. The method of claim 3, further comprising:

obtaining a measurement of a present temperature of the ToF imager; and determining a present value for the pre-determined offset based on the measurement of the present temperature and the stored plurality of values for the pre-determined offset at the different temperatures.

5. The method of claim 4, wherein determining the present value for the pre-determined offset comprises determining the present value for the pre-determined offset by performing an interpolation using the measurement of the present temperature and the stored plurality of values for the pre-determined offset at the different temperatures.

6. The method of claim 1, wherein the first histogram bin has a first bin index, wherein the method further comprises fine-tuning the first estimate of the distance of the closest target by adding an adjustment term to the first estimate, wherein the adjustment term is calculated based on the first value of the first histogram bin of the differential histogram, a second value of a second histogram bin of the histogram having the first bin index, and a third value of a third histogram bin of the histogram adjacent to the second histogram bin.

7. The method of claim 6, further comprising computing the adjustment term, comprising:

dividing the first value by a sum of the second value and the third value.

8. A method of operating a time-of-flight (ToF) ranging system, the method comprising:

transmitting, by a light source of the ToF ranging system, light pulses toward one or more targets;

receiving, by a ToF sensor of the ToF ranging system, the light pulses reflected by the one or more targets;

generating a histogram based on the received light pulses;

generating a differential histogram by computing differences between adjacent histogram bins of the histogram and assigning the computed differences as values of respective histogram bins of the differential histogram;

finding a first histogram bin of the differential histogram, wherein a first value of the first histogram bin of the differential histogram is larger than a pre-determined threshold or is a maximum value of the values of the histogram bins of the differential histogram, wherein the first histogram bin is a leftmost histogram bin of the differential histogram that has the first value; and computing an estimate of a distance of a closest target by adding a pre-determined offset to a first distance of the first histogram bin, wherein the pre-determined offset is proportional to half of a width of a light pulse transmitted by the light source.

9. The method of claim 8, wherein the width of the light pulse transmitted by the light source varies with temperature, wherein the method further comprises:

measuring the width of the light pulse transmitted by the light source at different temperatures beforehand;

measuring a present temperature of the light source; and calculating the pre-determined offset at the present temperature by performing an interpolation to generate an estimate of the width of the light pulse at the present temperature using the measured widths of the light pulse at the different temperatures.

10. The method of claim 8, wherein the first histogram bin has a first bin index, wherein the method further comprises fine-tuning the estimate of the distance of the closest target by adding an adjustment term to the estimate, wherein the adjustment term is calculated based on the first value and values of the histogram bins of the histogram around the first bin index.

11. The method of claim 8, wherein the pre-determined threshold is determined by an ambient noise level in the histogram and a user-specified scale factor.

12. A time-of-flight (ToF) ranging system comprising:

a light source configured to transmit light pulses for illuminating one or more targets;

a ToF sensor configured to receive reflected light pulses from the one or more targets and to generate a histogram based on the reflected light pulses;

a processor configured to determine a distance of a closest target of the one or more targets by:

finding a first rising edge in the histogram that corresponds to a rising edge of a reflected light pulse reflected by the closest target, wherein finding the first rising edge comprises:

computing differences between adjacent histogram bins of the histogram and assigning the computed differences as gradients of respective histogram bins of the histogram; and finding a first histogram bin of the histogram having a first value, wherein the first value is a maximum value of the computed differences, or is larger than a pre-determined threshold value, wherein the first histogram bin is a leftmost histogram bin of the histogram having the first value; and calculating an estimate of the distance of the closest target by adding a pre-determined offset to a distance of the first rising edge, wherein the pre-determined offset is proportional to half of a width of a transmitted light pulse.

* * * * *